July 5, 1938.   A. GRAVES   2,122,465
LIGHT PROJECTION SYSTEM PARTICULARLY FOR VEHICLE LAMPS
Filed June 1, 1935   2 Sheets-Sheet 1
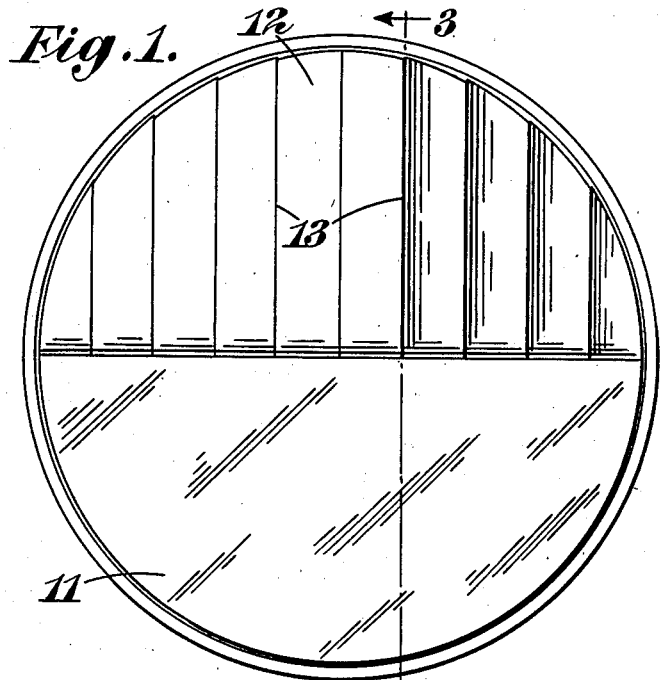
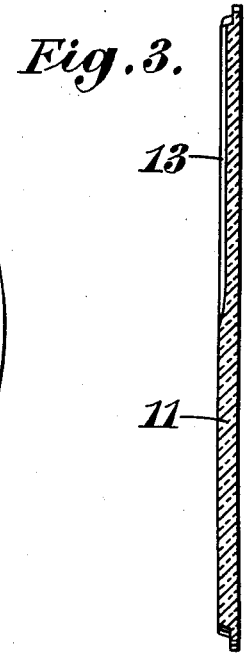
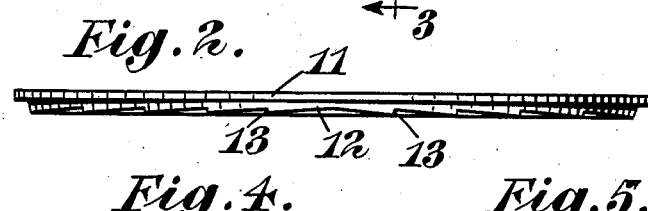
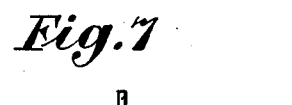
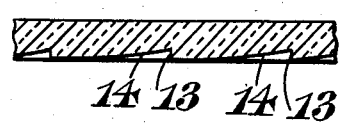
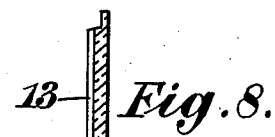
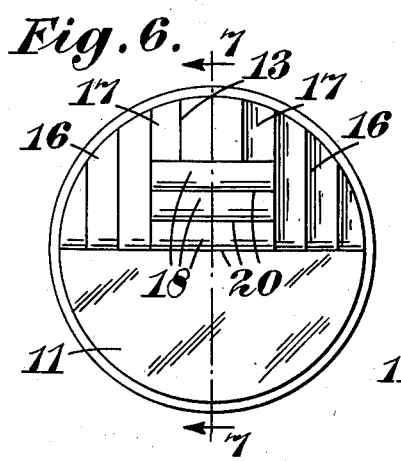
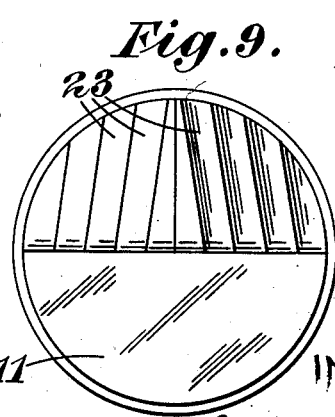
INVENTOR
Arnold Graves
By Byrnes, Stebbins & Blenko
Attys.

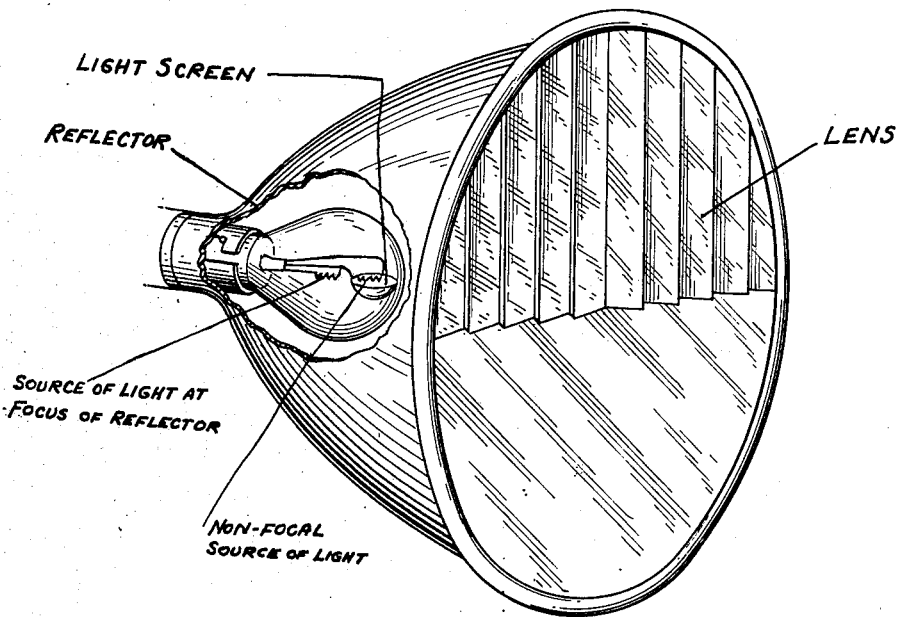

Patented July 5, 1938

2,122,465

UNITED STATES PATENT OFFICE 2,122,465

LIGHT-PROJECTION SYSTEM PARTICULARLY FOR VEHICLE LAMPS

Arnold Graves, Wheathampstead, England

Application June 1, 1935, Serial No. 24,557
In Great Britain March 20, 1934

4 Claims. (Cl. 240—41.25)

This invention comprises improvements in or relating to light-projection systems particularly for vehicle lamps having at least two selectively operable sources of illumination of which lamps described in United States Patent No. 1,716,048 are typical. In that patent there is described a vehicle lamp having two sources of illumination, one situated at the focus of a parabolic reflector and normally adapted to produce a substantially parallel beam of light and the other placed in a non-focal position and closely associated with a screening cup or shade in such a manner as to produce a flat-topped anti-dazzle beam passing through substantially one-half of the front glass only. It has been found that such a lamp possesses the disadvantage that the field of illumination produced by that light source which is not at the focus of the reflector is irregular in intensity, and it is the object of the present invention to correct this uneven illumination and to improve also the uniformity of the field produced by the long distance illumination without undue loss of light.

The present invention provides on the lens optical means for adjusting the characteristics of the light transmitted therethrough from a multiple filament lamp of the general type set out in United States Patent No. 1,716,048 with a minimum loss of light by absorption or dispersion. It has been found that this result may be achieved by providing on the upper half of the lens prism-shaped bars of transparent material such as glass. Each of these prisms-shaped bars modifies the light rays passing through it, the total light transmitted by the lens being thus divided into two or more beams, according to the number of the prism-shaped projections. Each of these groups of prisms or half flutes deflects laterally the portion of the beam of light passing through it, the total light transmitted by the front glass (when the screened source is in use) being substantially divided into two beam groups which subsequently recombine to form a field of illumination having the desired characteristics. Thus, in one form of the invention the prism-shaped bars are triangular in cross-section and are made integral with the lens itself and may be arranged either on the inside or on the outside face thereof.

The term "symmetrical" as used in this specification and claims connotes an arrangement of projections (prisms or half flutes) with respect to the vertical dividing line of the lamp glass such that corresponding projections on each side of the dividing line are mirror images one of the other.

When the screened source of light is situated in advance of the focus of the main reflector, which is a preferred arrangement, the anti-dazzle beam is projected through the top half of the front glass in the form of a converging beam which subsequently diverges.

In this case, a light-diverting arrangement, that is to say, with the short sides of the one-way prisms or half flutes in each of the two groups facing away from the centre vertical line of the front glass, is employed.

Thus, a reduction is brought about in the initial convergence and hence a corresponding reduction in the subsequent divergence of the anti-dazzle beam, and this results in an anti-dazzle beam of increased intensity and narrower spread. The main or driving beam, from the source of light at the focus, traverses the two halves of the front glass, that portion which passes through the modified half of the glass being separated into two beams and that portion which passes through the other half of the front glass filling in the central gap and overlapping the two beams formed by the modified portion of the lamp glass.

In splitting up the main beam into three beams, it is essential that these three beams should subsequently combine with suitable overlap so as to produce a field of more or less uniform intensity and it is also essential that the two side beams produced by the modified half of the glass shall not be so widely separated that the beam which passes through the other half of the front glass cannot fill in the central gap.

The present invention consists in an anti-dazzle illuminating system which comprises a reflector, a lamp having at least two selectively operable sources of light of the general type described in United States Patent No. 1,716,048 (where one source of light cooperates with a shield or screen) and a lamp glass whereof that portion through which light rays from the screened source of light pass after reflection from the reflector is provided with shallow vertical or substantially vertical one-way prisms or half flutes symmetrically disposed in two groups, one on each side of the vertical dividing line of the lamp glass and not extending beyond or substantially beyond the horizontal centre line of the lamp glass, the long face of each prism or half flute forming with the surface of the glass an angle (in the case of a prism) or a curvature (in the case of a half flute) which is insufficient to cause separation of the beam (when the focal source of light is in use) into non-overlapping beams and which is large enough to cause (when the screened source of light is in use) a definite narrowing of the beam.

The following factors have to be taken into consideration in determining the angle or curvature of the prisms or half flutes and their number and arrangement upon the lamp glass, viz:

(a) The thickness of the transparent medium of which the lens is made and its index of refraction;

(b) The inclination of the lens to the initial rays of light of the beam; and (c) The size, shape and position of the source of light and the characteristics of the main reflector.

Of these (a) varies with the particular lamp; (b) depends on the initial type of beam and on the type of lamp glass employed (varying from plane to convexo-concave or rather extreme curvature). With regard to (c) it should be remembered that a true point source of light is not at present available and therefore the beam produced is not truly parallel, with the result that, as is the case in current practice, the smaller types of headlamps, of the type which have short-focus reflectors, produce, with any given light source substantially at the focus, a more divergent beam than is produced by the larger diameter longer focus types with the same source of light. In one preferred form of the invention, the prism-shaped bars are triangular in cross section and are made integral with the lamp glass itself and are arranged either on the inside or the outside face of the glass as desired.

A characteristic feature of the present invention is the dual role played by the modified front glass which produces a narrowing of the anti-dazzle beam and a spreading of the composite main driving beam, without leaving a "hole" therein.

When the angle of the prisms is small, e. g. of the order of 1 or 2 degrees to the surface of the lens, the alteration in the angle of divergence or convergence of the beams of light passing therethrough is correspondingly small and in view of the fact that the wide prism faces are substantially perpendicular to the direction of projection of the beam the loss of light by absorption and dispersion will be a minimum.

Preferably the prism-shaped projections are arranged parallel to one another and substantially parallel to the vertical centre line of the lens. In one form the projections are symmetrically disposed with respect to the vertical centre-line of the lens, corresponding projections on either side of the vertical centre-line being mirror images of one another. When it is desired to modify the field of illumination so as to obtain increased illumination in one or more parts of the field the prism-shaped projections may be arranged unsymmetrically upon the lens.

When the screened source of light is in front of the focus of the reflector, the one-way prisms or half flutes are arranged on the upper portion of the lamp glass with the short face of each prism or half flute facing away from the vertical axis of the lamp glass, and when the screened source of light is behind the focus of the reflector, the one-way prisms or half flutes are arranged on the lower portion of the lens with their short faces facing towards the vertical axis of the lamp glass.

The prism-shaped projections are preferably formed integral with the lens and may be formed on one side (preferably the inside) thereof.

In one form of the invention the projections are triangular in section, the shorter side of the triangle facing away from the vertical centre-line of the lens. The number and slope of the faces of the prism-shaped projections may be varied according to the optical characteristics of the illuminating and reflecting system of the lamp for which the lens is to be used and according to the precise form of illumination required. If desired, there may be imposed upon the prism-shaped projections additional projections for modifying the characteristics of the rays emitted e. g. from the top of the lamp or from its extreme edges.

It will be understood that, in cases in which the horizontal divergence of the light beams requires correction by only a relatively small amount e. g. of the order of 5°, it is only necessary to employ comparatively flat prism-shaped projections. Thus, in one form of lens constructed in accordance with the present invention the angle of the triangular prism-shaped projections is of the order of 1 or 2°. In a ten-inch lens provided with ten vertical triangular prisms each 1 inch wide the difference in height of opposite edges of a prism will vary between $\frac{1}{32}$nd and $\frac{1}{64}$th of an inch. When the difference is greater than $\frac{1}{32}$nd of an inch (for a 1 inch prism) the change in direction of projection of the beams passing therethrough will be so great as to cause undue divergence or uneven illumination of the field (and may even lead, in the case of a lens arranged symmetrically about the vertical axis, to the formation of two separate fields of illumination). On the other hand when the difference is less than $\frac{1}{64}$th of an inch difficulties in accurately forming the prisms are greatly increased without any commensurate improvement in the optical results obtained.

It will be understood that the above measurements are quoted by way of example only and will naturally vary with the thickness of the glass and the refractive index of the material.

If desired, the lens may be asymmetrical about its vertical axis in order that the characteristics of the beam emerging through the two portions of the lens may be different; e. g. so that increased illumination may be produced on one side or the other of the field of illumination.

The invention may be applied with advantage to the landing lamps for aeroplanes, one of the primary characteristics of which is that they should provide a uniform and not too restricted field of illumination.

It will be understood that while in general it is preferred to leave the lower half of the lens plain it may in certain circumstances be desirable to provide certain light refracting devices on the lower half of the lens as well as the upper. In any case the lower half of the lens either remains plain or is provided with a substantially different arrangement of prisms to that on the upper half.

Following are descriptions by way of example and with reference to the accompanying drawings of methods of carrying the present invention into effect.

Similar parts are indicated by similar reference numerals throughout the drawings.

In the drawings:—

Figure 1 shows a front elevation of a lens for a motor car head lamp constructed in accordance with the present invention, the lamp being provided with a parabolic reflector and two sources of light, that source of light in front of the focus of the reflector being provided with a shield or screen on its under side;

Figure 2 shows a plan view of the same lens;

Figure 3 shows a section on the line 3—3 of Figure 1;

Figure 4 shows a modified form of prism-shaped projection in which the facing surface of the projection is convex;

Figure 5 shows a modified form of prism-shaped projection in which the facing surface of the prism is concave;

Figure 6 shows a modified form of lens in which the upper half thereof is provided with vertical and horizontal prism-shaped projections;

Figure 7 shows an enlarged vertical section on the line 7—7 of Figure 6;

Figure 8 shows an alternative construction of the lens shown in Figure 6 in which horizontal prism-shaped projections are formed near the top of the lens;

Figure 9 is a front elevation of a modification of the lens, and

Figure 10 is a perspective view with parts broken away, illustrating a lamp such as illustrated in Patent 1,716,048 with a lens such as shown in Fig. 1.

Referring to Figures 1, 2 and 3, a circular lens 11 ten inches in diameter is provided on its upper half with ten vertically disposed shallow prism-shaped projections 12 each one inch wide. The prism-shaped projections are arranged symmetrically about the vertical centre line of the lens and the long faces slope outwardly at an angle which varies between 0.5° and 2.5°. At the outer veritcal edge 13 of each prism-shaped surface the glass is cut perpendicularly for a distance between 1/64th and 1/32nd of an inch and the long face of the next prism commences at the bottom of this cut.

The long faces of the prism-shaped projections instead of being plane may be convex as at 14 of Figure 4 or concave as at 15 of Figure 5.

The modified form of lens shown in Figure 6 consists of a series of vertical prism-shaped projections 16 and the upper half of a lens 11, the four centre projections 17 being cut short and replaced by horizontal projections 18. The long faces of the horizontal projections slope upwardly and outwardly from the dividing faces 20. The arrangement shown in Figure 6 may be modified by interchanging the prism-shaped projections 17 and 18 as shown in the enlarged vertical section shown in Figure 8. In this case as in the modification shown in Figures 6 and 7 the long faces 21 of the prism-shaped projections slope upwardly and outwardly from the horizontal axis of the lens. By this arrangement of the long faces, the downwardly diverging rays from the non-focal light source are made less divergent and this reduction of divergence results in an anti-dazzle beam of increased intensity and longer range.

A further alternative construction is illustrated in Figure 9 in which the prism-shaped projections 23 are symmetrically arranged about the vertical centre line of the lens and are inclined to the vertical axis at a small angle which preferably is 5° or less.

The particular disposition of prism-shaped projections employed in any particular case will depend on the characteristics of the illumination which the lamp is to produce, and the nature of the reflecting and illuminating systems.

I claim:

1. A light projector comprising in combination with a reflector, a lens, a lamp having two selectively operable light sources, one located at the focus of the reflector and the other forwardly thereof, a cup-shaped screen arranged below the non-focal light source to restrict the light from that source to rays which are reflected by the upper half of the reflector in a downward and forward direction and through only the upper half of the lens which is provided with shallow vertical one-way triangular prisms symmetrically disposed in two groups, one group on each side of the vertical center line of the lens, and extending substantially to the horizontal center line of the lens, the long face of each prism forming with the plane of the lens, an angle which is insufficient to cause separation of the beam, when the source of light at the focus is in use, into non-overlapping beams, and which is large enough to cause a definite narrowing and concentration of the non-focal light beam.

2. A light projector comprising in combination with a reflector, a lens, a lamp having two selectively operable light sources, one located at the focus of the reflector and the other forwardly thereof, a cup-shaped screen arranged below the non-focal light source to restrict the light from that source to rays which are reflected by the upper half of the reflector in a downward and forward direction and through only the upper half of the lens which is provided with shallow vertical half-flutes symmetrically disposed in two groups, one group on each side of the vertical center line of the lens, and extending substantially to the horizontal center line of the lens, the chord of the half-flutes forming, with the plane of the lens, an angle which is insufficient to cause separation of the beam when the source of light at the focus is in use into non-overlapping beams, and which is large enough to cause a definite narrowing and concentration of the non-focal light beam.

3. A light projector comprising in combination with a reflector, a lens, a lamp having two selectively operable light sources, one located at the focus of the reflector and the other forwardly thereof, a cup-shaped screen arranged below the non-focal light source to restrict the light from that source to rays which are reflected by the upper half of the reflector in a downward and forward direction and through only the upper half of the lens which is provided with shallow concave vertical half-flutes symmetrically disposed in two groups, one group on each side of the vertical center line of the lens, and extending substantially to the horizontal center line of the lens, the chord of the half-flutes forming, with the plane of the lens, an angle which is insufficient to cause separation of the beam when the source of light at the focus is in use into non-overlapping beams, and which is large enough to cause a definite narrowing and concentration of the non-focal light beam.

4. A light projector comprising in combination with a reflector, a lens, a lamp having two selectively operable light sources, one located at the focus of the reflector and the other forwardly thereof, a cup-shaped screen arranged below the non-focal light source to restrict the light from that source to rays which are reflected by the upper half of the reflector in a downward and forward direction and through only the upper half of the lens which is provided with shallow convex vertical half-flutes symmetrically disposed in two groups, one group on each side of the vertical center line of the lens, and extending substantially to the horizontal center line of the lens, the chord of the half-flutes forming, with the plane of the lens, an angle which is insufficient to cause separation of the beam when the source of light at the focus is in use into non-overlapping beams, and which is large enough to cause a definite narrowing and concentration of the non-focal light beam.

ARNOLD GRAVES.